United States Patent [19]

Kinzenbaw

[11] Patent Number: 4,771,713
[45] Date of Patent: Sep. 20, 1988

[54] ROW CROP PLANTER CONVERTIBLE BETWEEN NARROW AND WIDE ROW SPACING

[76] Inventor: Jon E. Kinzenbaw, R.R. 1, Box 184, Williamsburg, Iowa 52368

[21] Appl. No.: 910,943

[22] Filed: Sep. 24, 1986

Related U.S. Application Data

[63] Continuation-in-part of Ser. No. 736,411, May 20, 1985, Pat. No. 4,648,334, which is a continuation of Ser. No. 534,541, Sep. 22, 1983, abandoned.

[51] Int. Cl.$^4$ ............................................... A01C 5/06
[52] U.S. Cl. ........................................ 111/52; 111/88; 172/776
[58] Field of Search ............... 111/73, 80, 85, 88, 111/6, 7, 69, 14, 15, 67, 52, 58, 59–63, 65, 66, 70, 71, 79, 82, 55; 172/166, 413, 810, 307, 308, 689, 776

[56] References Cited

U.S. PATENT DOCUMENTS

| | | |
|---|---|---|
| 756,907 | 4/1904 | Strathmann . |
| 1,272,550 | 7/1918 | Smith . |
| 1,298,674 | 4/1919 | Dicarlo .................. 111/66 X |
| 2,054,513 | 9/1936 | Kriegbaum et al. ............ 172/834 X |
| 2,090,525 | 8/1937 | Carrier et al. . |
| 2,518,822 | 9/1946 | Scott . |
| 2,616,348 | 11/1952 | Ariens ............................ 172/834 X |
| 3,031,984 | 6/1958 | Esmay . |
| 3,042,118 | 7/1962 | Norris . |
| 3,138,210 | 6/1964 | Behrens ..................... 172/834 |
| 3,336,885 | 8/1967 | Lebow . |
| 3,643,745 | 2/1972 | Betulius et al. . |
| 3,774,557 | 11/1973 | Esmay et al. . |
| 3,924,694 | 12/1975 | Baughman et al. . |
| 4,009,668 | 3/1977 | Brass et al. . |
| 4,266,489 | 5/1981 | Parramore . |
| 4,331,206 | 5/1982 | Linton ............................... 172/834 |
| 4,377,979 | 3/1983 | Peterson et al. . |
| 4,425,857 | 1/1984 | Lienemann et al. . |
| 4,611,545 | 9/1986 | Nickeson et al. ................. 111/73 X |
| 4,648,334 | 3/1987 | Kinzenbaw ........................... 111/52 |

FOREIGN PATENT DOCUMENTS

| | | |
|---|---|---|
| 2528930 | 1/1977 | Fed. Rep. of Germany ........ 111/85 |
| 3105656 | 9/1982 | Fed. Rep. of Germany ........ 111/52 |
| 1022236 | 3/1966 | United Kingdom ................. 111/85 |

OTHER PUBLICATIONS

Brochure–Kinze "Pusher Row Unit" (1 page).
Brochure–Kinze "Twin Line" Planters (4 pages).
Brochure–White Farm Equipment "Get the Productivity . . . "(2 pages).
Brochure–White Farm Equipment "5100 No–Till Special" (2 pages).
Brochure–White Farm Equipment "5100S Soybean Special" (2 pages).
Brochure–White Farm Equipment Company "Seedboss Planter" 1/86 GAV.

Primary Examiner—Robert A. Rafer
Assistant Examiner—Danton D. DeMille
Attorney, Agent, or Firm—Emrich & Dithmar

[57] ABSTRACT

An agricultural planter for row crops has conventional pull-type row units mounted to a frame at a relatively wide spacing for planting a crop such as corn. Push-type row units, each capable of planting two rows at a spacing which is one-third of the wide spacing are mounted to be pushed by the frame so that when both front and rear row units are used, a much narrower row spacing for beans or wheat, for example, can be achieved. The furrow openers on the push-type units are staggered fore-and-aft to avoid plugging of adjacent gauge wheels with field trash or clods of soil.

6 Claims, 2 Drawing Sheets

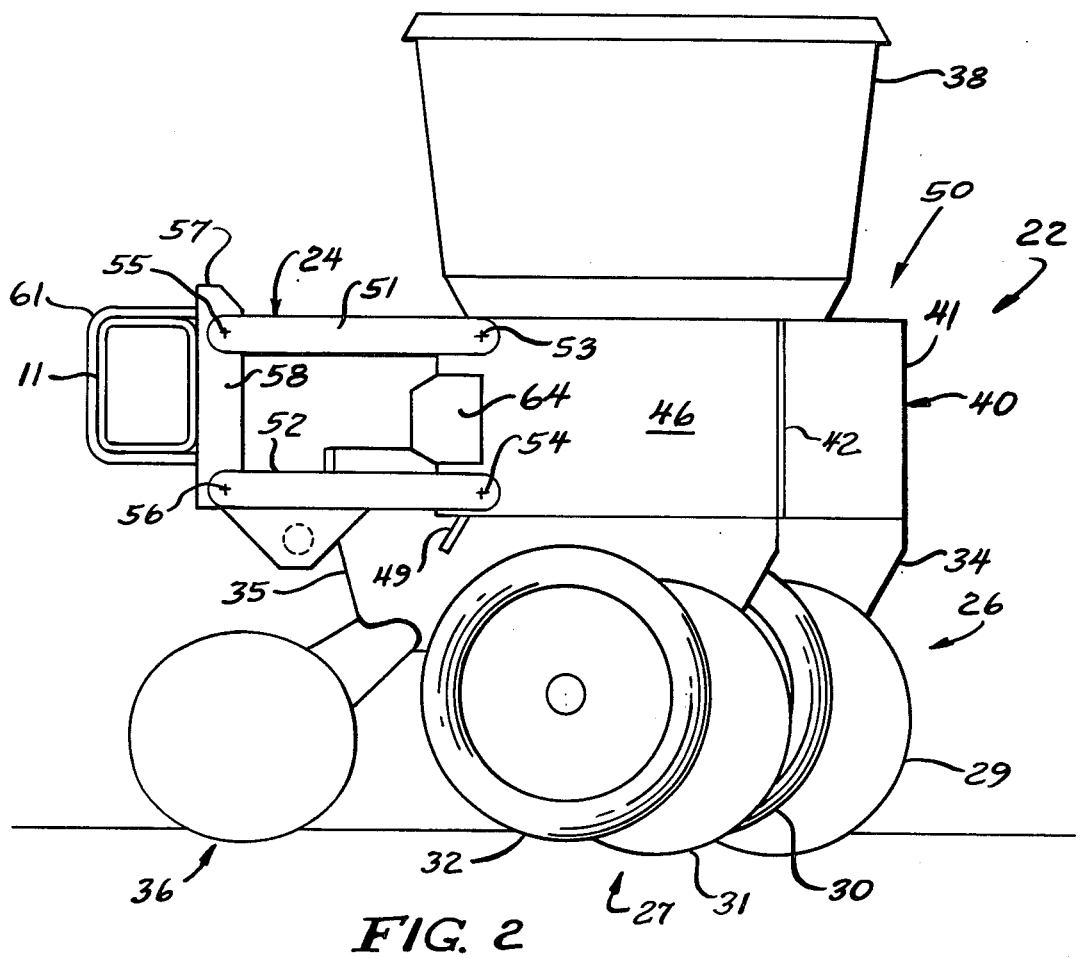

ROW CROP PLANTER CONVERTIBLE BETWEEN NARROW AND WIDE ROW SPACING

RELATED APPLICATION

This is a continuation-in-part application of my co-pending application Ser. No. 736,411, filed May 20, 1985, entitled "Agricultural Row Crop Planter With Rear-Driven Row Units", now U.S. Pat. No. 4,648,334, which is a continuation of my application Ser. No. 534,541 of the same title, filed Sept. 22, 1983 now abandoned.

FIELD OF THE INVENTION

The present invention relates to agricultural planters; and more particularly, it relates to a row crop planter which is capable of planting crops at a relatively wide row spacing, yet which is easily convertible without adding or removing any substantial structure, to plant a crop at a row spacing as little as one-third of the wide row spacing. Such a planter enables a farmer, for example, to plant corn at a 30" row spacing, and then elsewhere to plant soybeans or wheat at a row spacing as little as 10", and without physically removing, attaching or relocating individual row units.

BACKGROUND AND SUMMARY OF THE INVENTION

It is a fairly common practice for farmers having larger farms to plant more than one crop. In the midwest, a farmer may plant both corn and soybeans, and in western states, a farmer may plant corn and wheat. Typically, corn, being a larger crop, is planted at a row spacing of 30 inches. Soybeans are planted at ten, fifteen or thirty inch spacing, depending on the preferences and equipment of the farmer.

Since the planting season typically may include only ten days or so of good planting weather, it has become highly desirable to minimize the amount of time necessary to convert a planter from one crop to another. Of course, the farmer could buy and have prepared separate planters, but that would be unreasonably expensive. One solution to the problem is to provide a tandem planter—that is, two identical planters, one pulled behind the other, with the row units of the two planters being offset so that the row units on the rear planter are located to form furrow midway between the furrows formed on the forward planter. Such inter-row planter units are sometimes referred to as "interplant" units. Attempts have been made to make such planters rigid so that the placement of the interplant rows relative to the forward rows is fixed. However, such arrangements of tandem planters are expensive and have a considerable length such that they become unwieldy in making critical field maneuvers and in transport.

Another attempt to provide interplant row units simply mounts the interplant units on the same mounting bar as the regular units so that the mounting of units is side-by-side across the planter frame. This is possible and enables the achievement of 15" rows because commercial row units of a desirable type having double disc furrow openers and adjacent gauge wheels are available and they have a nominal width of approximately 15", leaving 15" between adjacent row units mounted to plant rows spaced at 30". There are two disadvantages with such a side-by-side arrangement. First, commercially available row units typically have a seed hopper mounted in a forward position above the furrow opener and a separate rear hopper for storing insecticide or herbicide which is deposited behind the furrow opener after the seed is deposited and the furrow is closed. These hoppers have to be replenished with seed and fertilizer/insecticide at least twice a day if the planter is used for a full day's planting. It is difficult for the farmer to take the lids off the hoppers when the row units are place immediately adjacent one another, and it is also difficult for the farmer to maneuver a 50-55 lb. bag of seed to replenish the forward hopper without spilling some of the seed. Moreover, it has been found in practice that when row units are mounted on a common bar in side-by-side relation, the adjacent gauge wheels of adjacent units are very close to one another and provide a natural trap for unbroken clods of soil or trash such as corn stalks or remaining unburied crop. This latter problem has become exacerbated with modern conservation planting techniques which leave more and more trash on the surface of the soil.

Moreover, from a manufacturer's standpoint, when row units are placed on a common mounting bar in side-by-side relation with the row units immediately adjacent one another, special arrangements have to be made to secure the planter support wheels to the frame. Normally, such support wheels are located between adjacent row units if the row units are spaced apart by 30" as they typically have been prior to inserting interplant row units between the normally spaced units.

In all such arrangements, the individual row units are mounted to one or more transverse mounting bars which are part of the planter frame by means of four-bar linkages which enable the row units individually to accomodate themselves to variations in ground contour. This is highly desirable because it is generally recognized that the depth of the furrow in which the seed is deposited is, particularly in the case of certain crops, a critical factor in determining the early and uniform emergence of the crop.

A more desirable and practical solution to the problem of providing a row crop planter which is easily convertible to different row spacings, as described in my above-identified co-pending application, is to provide the interplant row units in front of the planter frame so that they are pushed or driven by the planter frame during normal operation. This arrangement leaves adequate space between adjacent row units for access to the hoppers for replenishing the commodity in the hopper, and it also avoids the above-described problem of plugging the space between adjacent gauge wheels when row units are placed on a common mounting bar and immediately adjacent one another. Morevoer, I have found that the push-type row units can be mounted to the planter frame by means of four-bar linkages so that they individually can accomodate changes in ground contour.

However, the arrangement disclosed in my co-pending application is not capable of achieving a row space less than 15" if the rear or pull-type units are mounted at the desired 30" spacing for corn. In other words, because it is highly desirable to plant corn at a 30" row spacing since any lesser spacing is perceived as having a diminishing effect on yield, the rear row units of that arrangement are mounted at a 30" spacing, and the push-type row units are mounted at a similar spacing, and they are centered on the space between the rear units. Thus, when all row urits are used, the row spacing achieved is 15".

Such an arrangement is quickly and easily converted between either the wide or narrow row spacing by locking the forward row units in a raised position for the wide spacing and lowering them to the use position for the narrow spacing. In this arrangement, the rear row units are mounted to a rear mounting bar on the planter frame and a separate forward mounting bar is provided for the forward row units, with the support wheels being mounted between the forward and rear mounting bars. This configuration has been found to be very useful and has been commercially successful in that substantial numbers of planters in this configuration have been sold. Howeeer, because of the desirability of planting corn at a row spacing of no less than 30", such a configuration is not capable of achieving a row spacing less than 15" unless row units are placed immediately side-by-side on both the forward and rear mounting bars. Although such an arrangement is possible, it presents both of the aforementioned problems of (1) inconvenience in loading hoppers, and (2) plugging between adjacent gauge wheels for both the pull-type row units and the push-type row units, since the push-type row units also employ the opener type which has twin-disc furrow openers and adjacent gauge wheels.

The present invention provides improvements to the planter disclosed in my co-pending application. According to the present invention, a plurality of conventional pull-type units are mounted to a mounting bar on a planter frame at a 30" row spacing for corn, thereby leaving room between adjacent row units for access to the hoppers for filling. Similarly, push-type row units are mounted to the planter frame in front of a mounting bar at the same nominal spacing, and the push-type row units disclosed herein are preferrably, though not necessarily mounted to the same mounting bar, thereby reducing the cost of the planter frame and reducing the overall length of the planter. The planter support wheels are mounted between adjacent row units behind the mounting bar.

Moreover, the push-type row units are modified to include two separate planting mechanisms, each planting mechanism including a furrow opener and closer; and, in the illustrated embodiment, each planting mechanism has its own metering device, but they share a common hopper and frame. The spacing of the planting mechanisms on the forward row units is 10".

The planting mechanisms on the forward row units are located relative to the rear row units to achieve an overall row spacing of 10" when the forward row units are used.

Thus, the present invention provides a row crop planter which is readily convertible between a narrow row spacing and a wide row spacing without having to remove or add or relocate individual row units, but the present invention is capable of achieving a row spacing of 10" without the aforementioned problems of plugging and while providing convenient access to the row unit hoppers for filling. Thus, the present invention is capable of planting wheat as well as soybeans, it being desirable on the part of some farmers to plant soybeans at a 10" spacing, and it being a common practice to plant wheat, when it is planted in rows, at a spacing of 10".

Thus, the present invention provides a convertible planter which has a wide adaptability and is readily convertible, yet which is more economical from the standpoint of the cost of the planter frame.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 2 is a right side view of the push-type or forward row unit of the planter of FIG. 1; and FIG. 3 is a horizontal cross-sectional view of the push-type row unit shown in FIG. 2.

DETAILED DESCRIPTION OF THE PREFERRED EMBODIMENT

Figure 1:
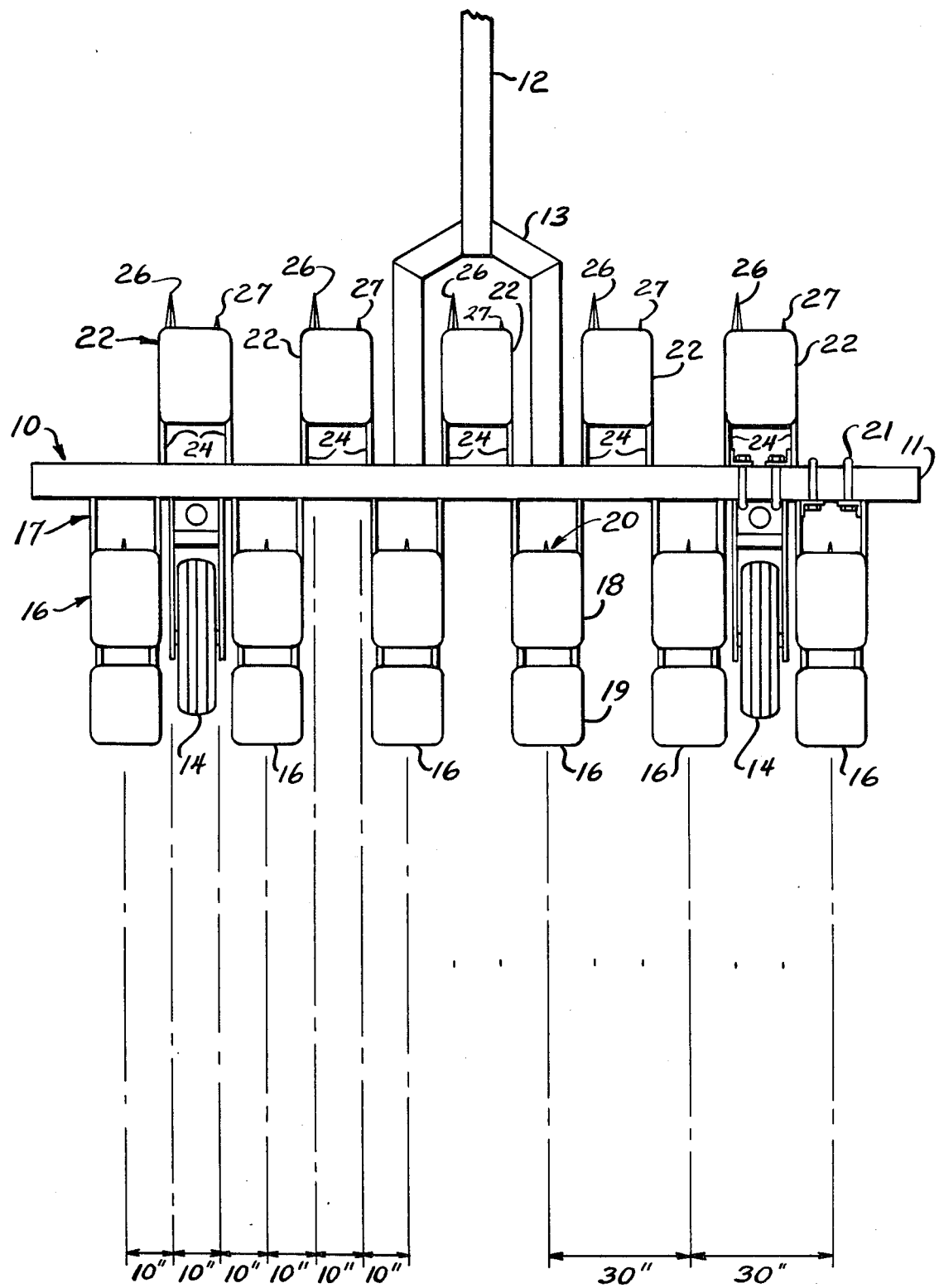
FIG. 1 is a plan view of a planter constructed according to the present invention.

Referring then to FIG. 1, there is shown an agricultural row crop planter including a frame generally designated 10 with a single transverse mounting bar 11 and a tongue 12 which is adapted to be hitched to an agricultural tractor. The tongue 12 is bifurcated as seen at 13 so that it is attached to the mounting bar 11 on either side of the centermost row unit of the forward set of row units.

The frame 10 is supported by a pair of support wheels 14 which are mounted behind the mounting bar 11 and between adjacent ones of the rear set of row units. As is conventional, the support wheels 14 are provided with hydraulic cylinders which, when actuated by the farmer, raise the planter frame and all the row units from the ground-engaging or use position to a raised or non-use position for end turns or for road transport.

A plurality of individual row units 16 are mounted behind the mounting bar 11 by conventional four-bar linkages such as the one generally designated 17. The row units 16 are the conventional pull-type row units having a seed hopper 18 and a herbicide/insecticide hopper 19. Beneath the seed hopper is a furrow forming mechanism generally designated 20 and including a double disc furrow opener with adjacent gauge wheels for gauging the depth of the furrow formed by the disc opener.

In the illustrated embodiment, there are six of the pull-type row units 16, and as indicated by the large dashed lines, the furrow forming mechanisms of the row units 16 are spaced to plant a crop at a 30" spacing, and this is desirable for wide row crops such as corn.

Still referring to FIG. 1, the four-bar linkages 17 are conventional, including upper and lower parallel links on each side of the row unit, with an anti-torsion bar (not shown) connected between the two bottom links and a down-pressure spring, if desired (also not shown). The forward ends of each of the four links are, in turn, pivotally connected to a mounting plate which, in turn, is mounted to the mounting bar 11 by means of conventional U-bolts and nuts, the U-bolts wrapping around three sides of the mounting bar 11 and extending rearwardly through the mounting plate, as seen at 21 in FIG. 1 for the row unit on the far right.

A second plurality (five, in the illustrated embodiment) of push-type row units generally designated 22 are mounted by means of four-bar linkages 24 in front of the mounting bar 11 and adapted to be driven or pushed by the planter frame. The centermost one of the push-type row units is located between the bifurcated portion 13 of the tongue 12 so as to be located on the center line of the planter. Each of the push-type row units 22 has two separate furrow-opening mechanisms, designated respectively 26 and 27. Each of the furrow opening mechanism 26, 27 is identical in structure and will be described further below, but it will be observed that they are staggered in the sense that the left furrow-opening mechanism 26 is located forwardly of the right furrow opening mechanism 27.

To continue the example already started, with the rear row unit 16 spaced 30" apart, the furrow opening mechanisms 26, 27 on the push-type row units 22 are located 10" apart, and the forward row units are mounted such that their center lines are located midway between the center lines of the rear row units 16. When all the row units are aligned and mounted, the spacing between adjacent seed furrows is 10". For example, the left-most seed furrow is formed by the furrow opening mechanism 20 of the left-most row unit 16; the second furrow from the left is formed by the furrow opening mechanism 26 of the left-most row unit 22; the third seed furrow is formed by the furrow-forming mechanism 27 on the left-most row unit 22, and so on.

Turning now to FIGS. 2 and 3, the furrow opening mechanism 26 also includes a pair of discs 29 for forming the furrow, and a pair of gauge wheels 30 adjacent the discs 29 on the outboard sides thereof for gauging the depth of the furrow. The furrow opener 27 similarly includes a pair of discs 31 and a pair of outboard gauge wheels 32.

The discs 29 and gauge wheels 30 of the opener 26 are mounted to a shank 34; and the discs 31 and gauge wheels 32 are similarly mounted to a shank 35. A seed tube 37 couples seed from a seed meter (not shown) and located in a forward portion of a hopper 38 from the hopper to the furrow formed by the discs 29. A similar seed tube 39 directs seed from a separate meter (also not shown) in the hopper 38 into the right side furrow formed by the furrow opening mechanism 27. Thus, the hopper 38 forms a common hopper for both forward furrow openers 26, 27 and, separate seed meters are provided so that each seed meter may be vertically aligned with its associated seed tube 37, 39. However, the present invention is not limited to two separate seed meters and persons skilled in the art readily will be able to provide a single meter capable of feeding both adjacent furrow opening mechanisms 26, 27 carried on a common row unit frame, as will be described.

The shanks 34, 35 are bolted to a forward tie plate generally designated 40 and including a forward offset section 41 to which shank 34 is bolted, and a rear offset section 42 to which shank 35 is connected. Similarly, the rear portions of the shanks 34, 35 are rigidly connected to a rear tie plate 43. As seen in FIG. 2, a conventional pair of angled closing wheels generally designated 36 is attached to the rear of the right side shank 35. A similar pair of closing wheels for closing the left side furrow is connected to the left side shank 34, but are not shown in FIG. 2 for clarity.

The forward tie plate 40 is rigidly attached (by bolts or welding) to left and right side panels 45, 46; and the rear of the left side shank 34 is braced against the left side panel 45 by means of a plate 48. Similarly, the right side shank 35 is attached at an intermediate location to the right side panel 46 by means of a welded plate 49, seen in FIGS. 2 and 3.

Referring now particularly to FIG. 2, the shanks 34, 35, the side panels 45, 46, the forward and rear tie plates 40, 43, and the associated bracing form a frame for the row unit 22. The row unit frame in generally designated 50 in FIG. 2, and it is connected to the mounting bar 11 by the previously identified four-bar linkage 24 which will now be described in greater detail.

The four-bar linkage 24 includes upper and lower right side links 51, 52 which are pivotally connected respectively at 53 and 54 to the side plate 46 of the row unit frame 50. The links 51, 52 are pivotally connected at their rear ends at 55, 56 respectively to a mounting plate 57 which has forwardly turned flanges 58, 59 (see FIG. 3); and the mounting plate 57 is mounted to the mounting bar 11 by means of left and right side U-bolts 60, 61, similar to the U-bolts which mount the rear row units to the mounting bar 11. A similar pair of upper and lower links are used to mount the left side of the row unit frame 50 to the left side of the mounting plate 57; and the lower links of the respective pairs are tied together by means of at a torsion bar designated 61 in FIG. 3.

Returning to FIG. 2, a pair of plates, one of which is seen at 64 in FIG. 2 are welded respectively to the rear portions of the side panels 45, 46; and they extend rearward of those panels between associated ones of the upper and lower links of the four-bar linkage 24. The plates limit the vertical motion of the row unit relative to the mounting bar. When it is desired to render the forward units inoperative they may be lifted, and a block of wood or the like inserted between the lower links and the lock plates 64. The drive chain s also removed so the meters on the forward units are not driven to reduce wear. Equivalent means can be provided for locking the row units in the raised position, or they may be made inoperative simply by disengaging the chain which drives the meters on by emptying or removing the hoppers.

As best seen in FIG. 3, the gauge wheels 30 and 31 are narrow in relation to the width of conventional gauge wheels. This is possible because four gauge wheels support the push-type row unit 22, and lesser floatation is required because only a single hopper 38 (for seeds) need be used in planting soybeans. It will also be observed from FIG. 3 that the left side furrow opener 26 is located forwardly of the right side forward furrow opener 27. This creates sufficient space between the adjacent furrow openers, even though they are mounted to a common frame, to accomodate the flow of soil and trash without plugging the space between adjacent inside gauge wheels 30, 32. Although they are both rigidly mounted to a common frame in the illustrated embodiment so that they are raised and lowered together, the invention contemplates that the furrow openers 26, 27 may be arranged for independent vertical motion, if use is intended where ground contours require such independent motion.

As indicated above, and as best seen by reference to FIG. 3, the seed tubes 37, 39 are also offset in the fore-and-aft direction; and as indicated above, a separate seed meter is associated with each of the seed tubes 37, 39, and conveniently located directly above its asscciated tube. Persons skilled in the art, however, will readily appreciate that even though directly feeding seed from the meters into the seed tubes is desirable, it is not necessary to practice the invention, and the hopper 38 could easily be raised and an intermediate drop tube could be inserted between the hopper and the seed tubes, allowing the seed meters to remain in line to be driven by a common lateral shaft, rather than offset in the fore-and-aft direction.

Having thus disclosed in detail a preferred embodiment of the invention, persons skilled in the art will be able to modify certain of the structure which has been described and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for planting crop at a first or a second row spacing comprising: a frame; a plurality of first row units; a plurality of first mounting means for mounting said first row units to said frame at said first spacing between adjacent units, said first mounting means connecting said row units to be pulled by said frame and for permitting individual ones of said first row units to conform to ground contour independently of the other row units; a plurality of second row units; a plurality of second mounting means for mounting said second row units to said frame at a fixed lateral spacing and located between adjacent ones of said first row units laterally and spaced from said first row units in the fore-and-aft direction, said second mounting means mounting said second row units to be pushed by said frame and permitting individual ones of said second row units to conform to ground contour independently of the otehr row units, whereby when only said first row units are in use, the crop will be planted at said first row spacing, and when said first and second units are in use, the crop will be planted at said second row spacing.

2. The apparatus of claim 1 wherein each of said second row units comprises a row unit frame and first and second furrow opening mechanism mounted to said row unit frame at a fixed lateral spacing of approximately one-third the distance between adjacent ones of said first row units, whereby when said first and second row units are operated in the use position, said planter will plant crops at a row spacing approximately one-third the distance of the row spacing when only said first row units are operated.

3. The apparatus of claim 2 wherein each of said second mounting means comprises four-bar linkage means extending in front of said planter frame for maintaining the associated row unit in substantially the same vertical orientation while permitting said row unit to follow ground contour.

4. The apparatus of claim 3 wherein said first and second furrow opening means on said row unit frame each comprise a double disc furrow opener and a pair of gauge wheels, one next to each disc of said disc opener; and wherein said first furrow opener is located forwardly of said second furrow opener, thereby to facilitate the flow of soil and trash between adjacent gauge wheels on said first and second furrow opening mechanisms.

5. The apparatus of claim 3 characterized in that said first and second row units are all mountedt to the same transverse mounting bar.

6. The apparatus of claim 3 wherein said planter frame includes a transverse mounting bar for carrying said second row units and a hitch extending forwardly and adapted to be hitched to a tractor at its forward end and bifurcated at its rear portion to receive the center one of said second row units.

* * * * *